United States Patent

Elghanayan et al.

[19]

[11] Patent Number: 5,848,135
[45] Date of Patent: Dec. 8, 1998

[54] BATTERY-POWERED ADAPTER

[75] Inventors: Jeffrey Elghanayan, Laguna Beach, Calif.; David W. Wallis, Atlanta, Ga.

[73] Assignee: In a Pinch Inc., White Plains, N.Y.

[21] Appl. No.: 509,958

[22] Filed: Aug. 1, 1995

[51] Int. Cl.$^6$ .................................................. H04M 11/00
[52] U.S. Cl. .................... 379/100.01; 358/434; 358/442; 379/100.02
[58] Field of Search ................................ 379/100, 98, 93, 379/418, 373, 441, 442, 100.01, 100.02, 100.06, 100.14, 93.28, 93.01, 93.05; 358/442, 434, 468

[56] References Cited

U.S. PATENT DOCUMENTS

| | | | |
|---|---|---|---|
| 4,192,007 | 3/1980 | Becker | 379/418 |
| 4,652,933 | 3/1987 | Koshiishi . | |
| 4,930,017 | 5/1990 | Izawa . | |
| 4,964,154 | 10/1990 | Shimotono | 379/100 |
| 4,991,200 | 2/1991 | Lin . | |
| 4,998,248 | 3/1991 | Matsuzaki . | |
| 5,452,106 | 9/1995 | Perkins | 379/100 |
| 5,588,047 | 12/1996 | Rosengren et al. | 379/100 |

OTHER PUBLICATIONS

PC Zone Catalog At 90.
Zoom Telephonics Comdex Advertisement, Spring 1990.
Reyes, Zoom Telephonics Ex Command Language, Aug. 1, 1990.

*Primary Examiner*—Stella Woo
*Attorney, Agent, or Firm*—Hale and Dorr LLP

[57] ABSTRACT

A normally straight-through connection from a computer fax modem to a fax machine, or other fax sender to fax receiver, is briefly interrupted under battery power to supply the fax modem with a simulated dialtone and the fax machine with a simulated ring signal, which is supplied via a DC-to-DC converter activated by the same clock signal from which the dialtone and simulated ring signal are derived.

23 Claims, 3 Drawing Sheets

BATTERY-POWERED ADAPTER

BACKGROUND OF THE INVENTION

Many a portable computer user has encountered a situation in which printing or scanning a document is desirable, but, for any of a number of reasons, there is no printer or scanner available. For example, users who are away from their offices and homes, such as business travellers, often use their portable computers at locations, such as hotels and customer sites, where compatible printers and scanners are unavailable. Because printers and scanners are heavy and every ounce of additional weight is of significant concern to the portable computer user, carrying a printer or scanner in addition to the portable computer is typically not a practical option.

SUMMARY OF THE INVENTION

A normally straight-through connection from a computer fax modem to a fax machine, or other fax sender to fax receiver, is briefly interrupted under battery power to supply the fax modem with a simulated dialtone and the fax machine with a simulated ring signal, which is supplied via a DC-to-DC converter activated by the same clock signal from which the dialtone and simulated ring signal are derived.

In anther aspect of the invention, a battery-powered adapter is provided, wherein when a user presses or otherwise actuates a momentary switch, a battery circuit provides power to components of the adapter for a predetermined time interval or until the adapter receives an off-hook signal detected by a current sensor. In one embodiment an oscillator simultaneously drives both a divide-by-n counter to produce ring timing and simulated dialtone signals, and a DC-to-DC voltage converter to produce a high-voltage signal. After the adapter receives fax-initiating tones triggering a tone-detector, a high-voltage switch responds to the ring timing signal to derive a simulated ring signal from the high-voltage signal. Except for the brief interval between initial switch actuation and the off-hook signal, the adapter provides a powerless straight-through connection between the phone connectors.

The design enables construction of a miniature self-contained, battery-powered adapter for printing or scanning which can be used, when the occasion demands, between fax senders and receivers, e.g., a fax/modem-equipped portable computer and either a fax machine or another fax/modem-equipped portable computer.

DESCRIPTION OF THE PREFERRED EMBODIMENTS

Figure 1:
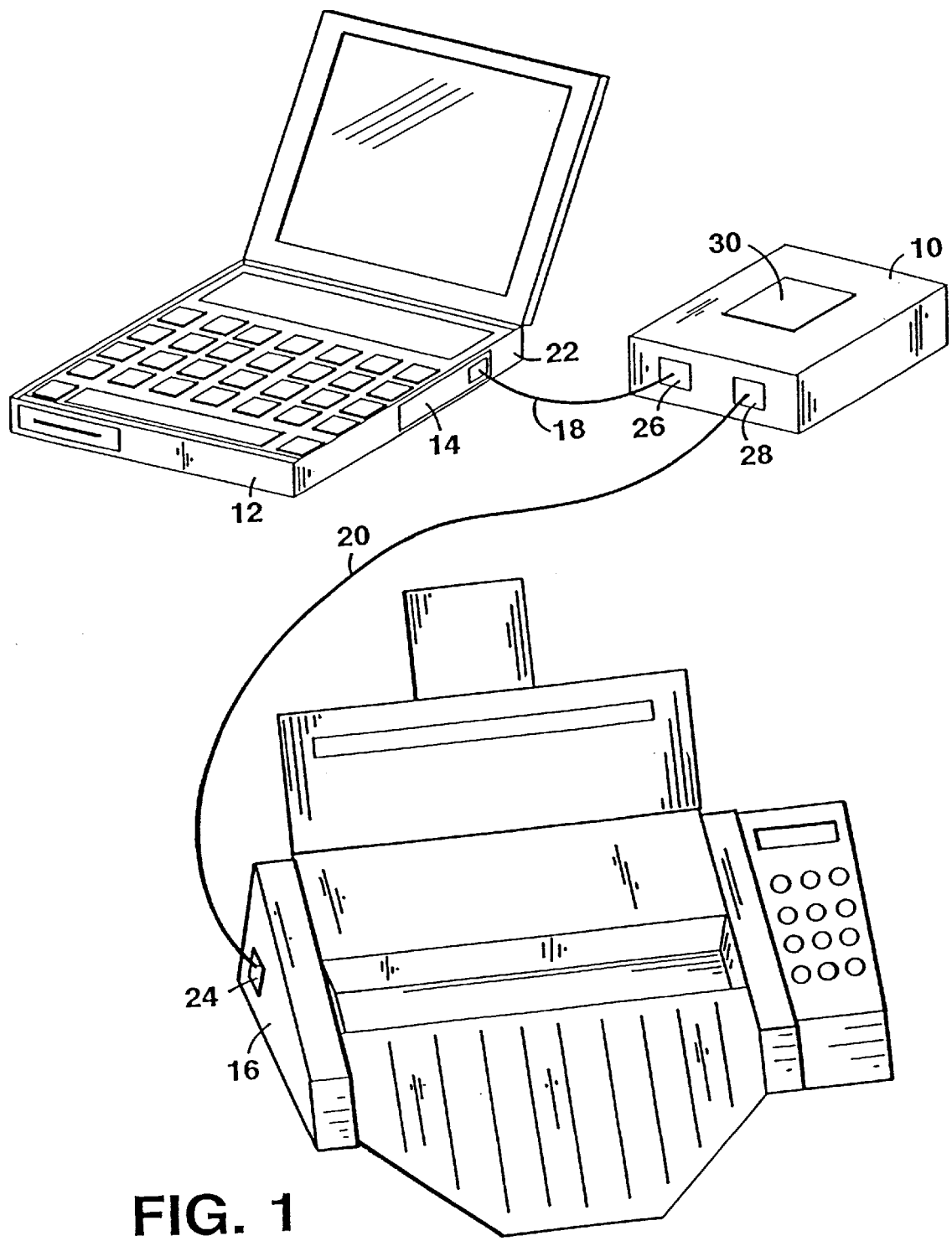
FIG. 1 is a pictorial view showing an adapter according to the invention connected between a fax machine and a portable computer with a faxmodem.

To print using an adapter 10 according to the invention, a user having a computer 12 containing a faxmodem 14 also needs a fax machine 16 and two standard telephone cables 18, 20 (FIG. 1). Both the faxmodem 14 and the fax machine 16 provide standard telephone jacks 22, 24, marked LINE, designed to receive such standard telephone cables. Similarly, the adapter 10 has two such jacks: a computer jack 26 for connecting to the faxmodem 14 and a fax jack 28 for connecting to the fax machine 16. The adapter 10 also sports a momentary switch 30 with which the user activates the adapter 10 as described below.

The user first connects the fax machine 16 to the adapter 10 in the following way. If the fax machine 16 is connected to a telephone line, the user first disconnects the fax machine 16 from the telephone line. Then the user connects the LINE jack 24 of the fax machine 16 to the fax jack 28 of the adapter 10 using the first telephone cable 20. Likewise, the user then connects the LINE jack 22 of the faxmodem 14 to the computer jack 26 of the adapter 10 using the second telephone cable 18.

Finally, the user directs the computer 12 to send a computer document by fax using the faxmodem 14. Within a predetermined time interval, e.g., 15 seconds, of so directing the computer 12, the user presses the momentary switch 30 on the adapter 10. No further action is required of the user for successful printing. The fax machine 16 then receives and prints a copy of the computer document sent by the computer 12.

Figure 2:
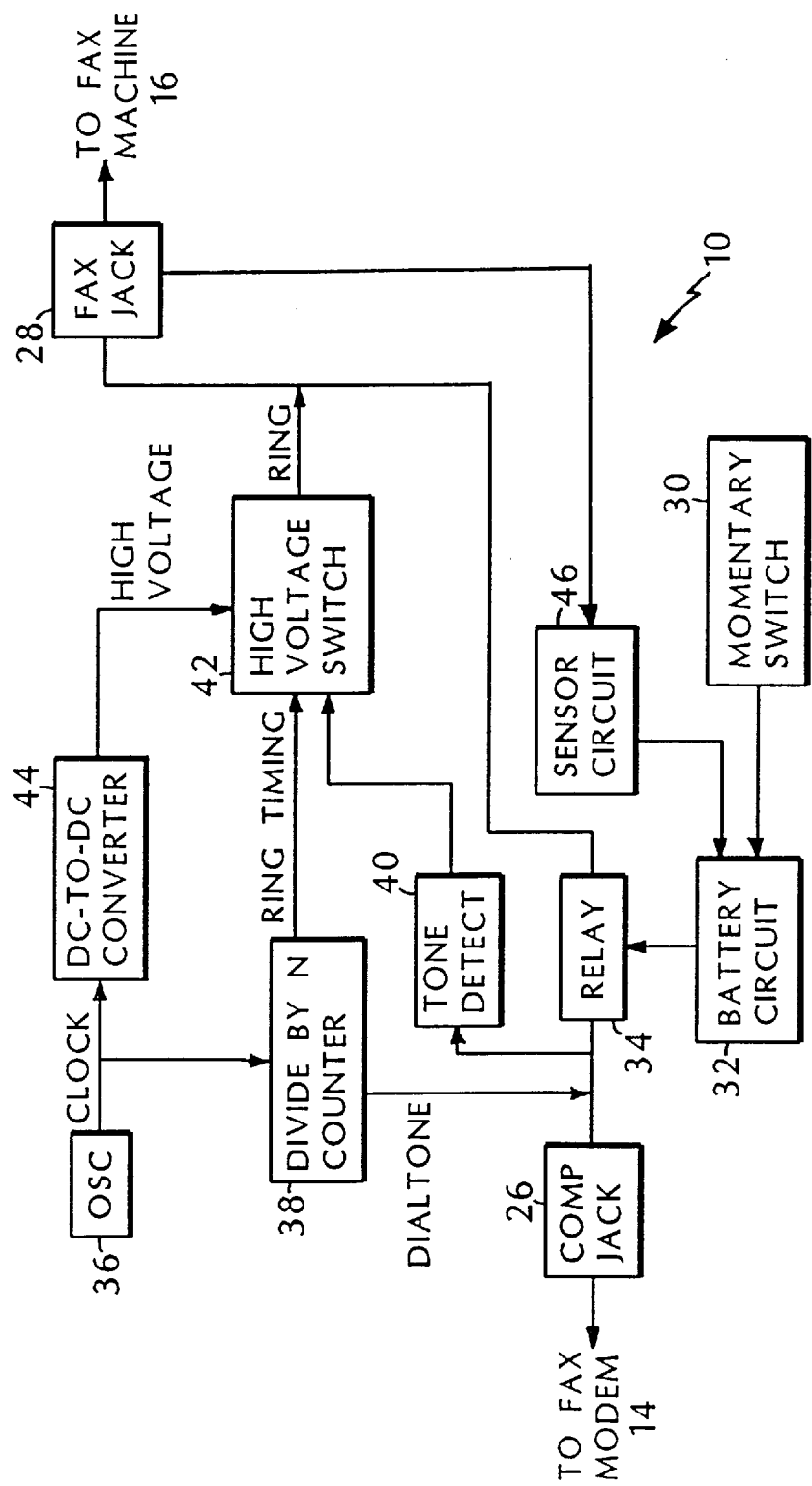
FIG. 2 is a functional block diagram of an adapter according to the invention.

With reference to FIG. 2, operation of the adapter 10 and its functional components is described as follows. The adapter 10 is normally in an "off" state wherein the adapter 10 uses essentially no power and appears electrically merely as a passive "straight-through" connection between the faxmodem 14 and the fax machine 16. However, when the user presses the momentary switch 30, the adapter 10 "wakes up" into an "on" state and its components operate in the following sequence. First, a battery circuit 32 activates, supplying battery power to the components of the adapter 10 and opening a normally-closed relay 34, thus breaking the straight-through connection of the fax machine 16 to the faxmodem 14. An oscillator circuit 36 drives a divide-by-n counter circuit 38 to send a simulated dialtone signal to the faxmodem 14 via the computer jack 26. To ensure that the faxmodem 14 and the fax machine 16 are triggered in proper order, the adapter 10 then waits until a tone detector circuit 40 detects fax-initiating tones from the faxmodem 14.

After such detection, the divide-by-n counter circuit 38 drives a high-voltage switch circuit 42 to derive, from a high-voltage signal produced by a DC-to-DC converter circuit 44, a simulated ring signal which is sent to the fax machine 16 via the fax jack 28. Finally, after a current sensor circuit 46 detects that the fax machine 16 has answered the simulated ring signal, i.e., has entered an off-hook state, the battery circuit 32 de-activates, disconnecting battery power from the components of the adapter 10 and returning the adapter 10 to an "off" state. Thus, at that point, the simulated dialtone and ring signals cease and the normally-closed relay 34 closes, re-establishing the straight-through connection of the faxmodem 14 to the fax machine 16. The adapter 10 then remains in an "off" state until the momentary switch 30 is pressed again.

Figure 3:
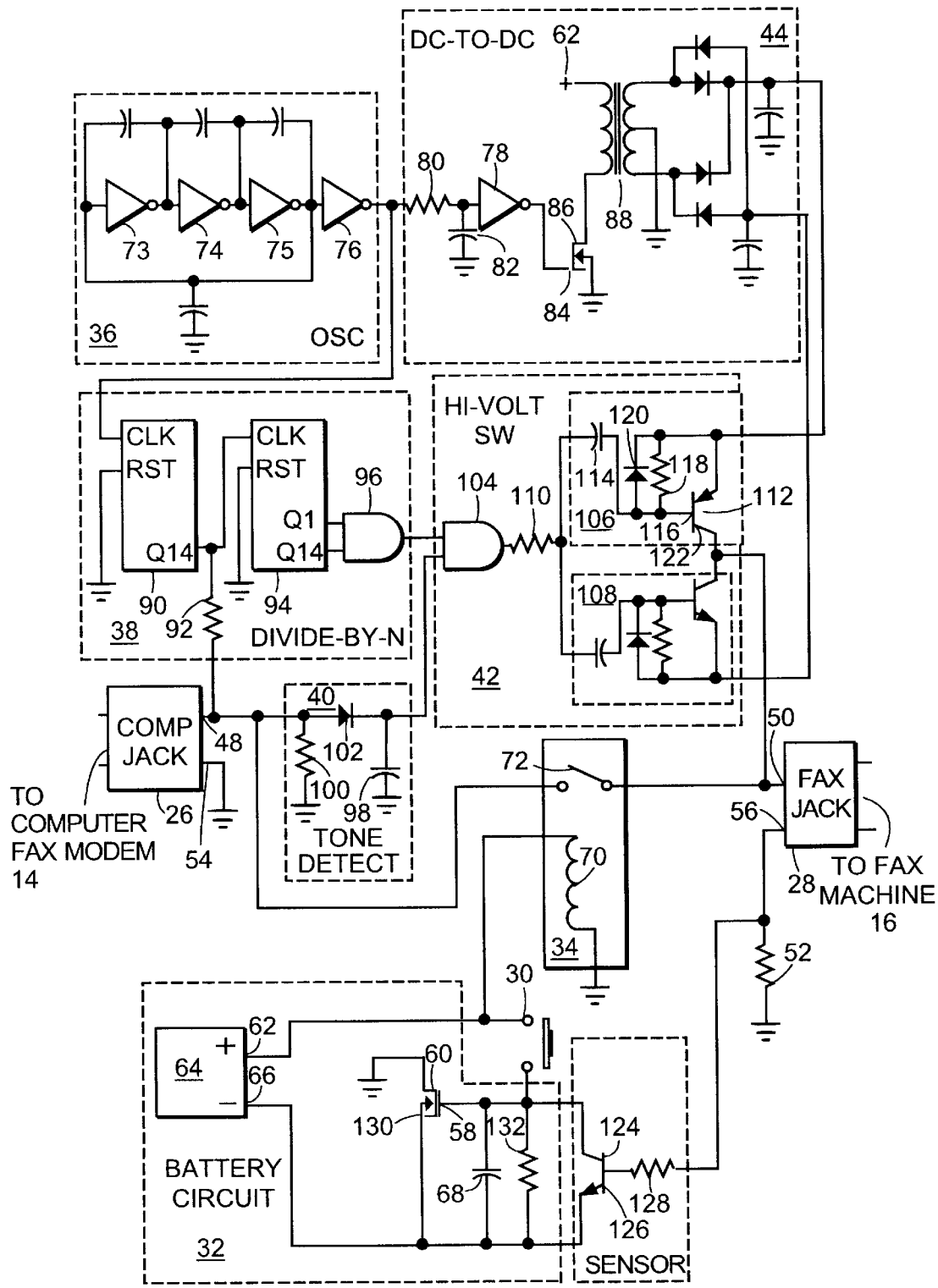
FIG. 3 is a detailed schematic of an illustrative implementation of an adapter according to the invention.

FIG. 3 shows an illustrative implementation of the adapter 10. The straight-through connection is normally present between the computer jack 26 and the fax jack 28 because the normally-closed relay 34 links a first set of pins 48, 50 of the jacks 26, 28 and a low-resistance current-detector resistor 52 links a second set of pins 54, 56. Thus the straight-through connection exists only so long as the normally-closed relay 34 is not opened, as described below.

When the user presses the momentary switch 30, connecting a gate 58 of a first FET transistor 60 to a positive terminal 62 of a 6-volt battery 64, the first FET transistor 60 enters an "on" state. As a result, ground is connected to a negative terminal 66 of the battery 64, allowing the battery 64 to provide power to the components of the adapter 10. Charged to the battery voltage of 6 volts, a holding capacitor 68 maintains the first FET transistor 60 in an "on" state after the user releases the momentary switch 30.

When the first FET transistor 60 enters an "on" state, current flows through a coil 70 in the relay 34, opening a normally-closed switch 72 in the relay 34. With the normally-closed switch 72 open, the first set of pins 48, 50 of the jacks 26, 28 are no longer linked. In this way, the adapter 10 ensures that the simulated ring signal sent to the fax machine 16 does not interfere with the simulated dial-tone signal sent to the faxmodem 14.

Activated as well when the first FET transistor 60 enters an "on" state, a feedback loop of three inverters 73, 74, and 75 in the oscillator circuit 30 drives a fourth inverter 76 to produce a clock signal.

Responsive to the clock signal and buffered by a fifth inverter 78, a resistor 80—capacitor 82 one-shot network in the DC-to-DC converter circuit 44 regulates output power of the simulated ring signal by producing a switching signal with a duty cycle lower than that of the clock signal. Receiving the switching signal at its gate 84, a second FET transistor 86 drives a 20:1 transformer 88 to derive, from the battery 64, a 120-volt AC signal. The 120-volt AC signal is then full-wave rectified and filtered into a high-voltage DC signal having a negative voltage of 60 volts and a positive voltage of 60 volts, relative to ground.

Simultaneously, in the divide-by-n counter circuit 38, a first 14-bit counter 90 divides the clock signal to create the simulated dialtone signal, which is sent across a current-limiting resistor 92 to the faxmodem 14. The simulated dialtone signal also drives a second 14-bit counter 94 to produce a cadence signal and a ring frequency signal. A first AND gate 96 combines the cadence signal and the ring frequency signal to produce a ring timing signal used in the high-voltage switch circuit 42.

Also used in the high-voltage switch circuit 42 is a tone-detected signal generated by the tone detector circuit 40. Upon receipt of fax-initiating tones from the faxmodem 14, a capacitor 98, initially held uncharged by a divider network of the current-limiting resistor 92 and another resistor 100, builds a charge sustained by a diode 102, producing the tone-detected signal.

Intercepting the ring timing signal in the high-voltage switch circuit 42, a second AND gate 104 prevents the ring timing signal from reaching upper 106 and lower 108 stages of the high-voltage switch circuit 42 until receipt of the tone-detected signal. Through a current-limiting resistor 110, the ring timing signal then controls, as described below, how the upper 106 and lower 108 stages create the simulated ring signal.

In the upper stage 106, a PNP transistor 112, with the ring timing signal AC-coupled through a capacitor 114 to its base 116, enters an "on" state when the ring timing signal is low. When the ring timing signal is high, a resistor 118 discharges the capacitor 114 to return the PNP transistor 112, protected from excessive reverse bias by a diode 120, to an "off" state. Connected to a collector 122 of the PNP transistor 112, the first pin 50 of the fax jack 28 then receives the positive voltage of the high-voltage signal only when the ring timing signal is low. Likewise, with a similar connection to the lower stage 108, the first pin 50 receives the negative voltage of the high-voltage signal only when the ring timing signal is high. Thus the high-voltage switch circuit 42 produces the 120-volt simulated ring signal. The fax machine 16 then receives the simulated ring signal via the first pin 50 of the fax jack 28 and the second telephone cable 20.

Answering after receiving the simulated ring signal, the fax machine 16 draws current, indicating an off-hook signal. As a result, current flows from the second pin 56 of the fax jack 28 across the current-detector resistor 52. Thus, at its base 124, a second NPN transistor 126 receives, through a current-limiting resistor 128, a positive bias relative to ground, which causes the second NPN transistor 126 to enter an "on" state.

In an "on" state, the second NPN transistor 126 produces a short circuit between gate 58 and source 130 of the first FET transistor 60, which then returns to an "off" state. Thus ground is disconnected from the negative terminal 66 of the battery 64, disconnecting battery power from the adapter 10.

However, even if the fax machine 16 never answers the simulated ring signal, the first FET transistor 60 enters an "off" state after a predetermined time interval anyway. This is so because, in the battery circuit 32, a bleeder resistor 132 slowly draws current from the holding capacitor 68, slowly lowering the voltage bias across the gate 58 and source 130 of the first FET transistor 80. Eventually the voltage bias drops to a point low enough that the first FET transistor 60 enters an "off" state, disconnecting ground from the negative terminal 66 of the battery 64.

At this point, with current ceasing to flow through its coil 70, the normally-closed switch 72 of the relay 34 closes, re-establishing the "straight-through" connection between the fax modem 14 and the fax machine 16.

What is claimed is:

1. A portable, self-contained battery-powered adapter for connection between a fax sender and a fax receiver, comprising two telephone line connectors;

an oscillator producing a clock signal;

a divide-by-n counter driven by the clock signal to produce a simulated dialtone signal and a ring timing signal;

means for applying the simulated dialtone signal to one of the connectors;

a DC-to-DC converter driven by the same clock signal to produce a high-voltage output;

a high-voltage switch responsive to the ring timing signal for deriving a simulated ring signal from the high-voltage output; and means for applying the simulated ring signal to the other connector.

2. The adapter of claim 1 further comprising an activation switch; and a battery circuit controlling connection of battery power to the adapter, the battery circuit being responsive to actuation of the activation switch for providing battery power to the adapter for a predetermined time interval, and being further responsive to an off-hook signal from the other connector for removing battery power from the adapter.

3. The adapter of claim 1 wherein the fax sender is a portable computer fax modem.

4. The adapter of claim 1 wherein the fax sender is a fax machine.

5. The adapter of claim 1 wherein the fax receiver is a portable computer fax modem.

6. The adapter of claim 1 wherein the fax receiver is a fax machine.

7. The adapter of claim 1 wherein the fax sender and receiver are both portable computer fax modems.

8. The adapter of claim 1 wherein the fax sender is a portable computer fax modem and the fax receiver is a fax machine.

9. The adapter of claim 1 wherein the fax receiver is a portable computer fax modem and the fax sender is a fax machine.

10. The adapter of claim 1, further comprising:

a transformer driven by the same clock signal to produce a high-voltage output.

11. A portable, self-contained battery-powered adapter for connection between a fax sender and a fax receiver, comprising two telephone line connectors;

an oscillator producing a clock signal;

a divide-by-n counter driven by the clock signal to produce a simulated dialtone signal and a ring timing signal;

means for applying the simulated dialtone signal to one of the connectors, a DC-to-DC converter driven by the same clock signal to produce a high-voltage output that includes both positive and negative high voltage outputs;

a high-voltage switch responsive to the ring timing signal for deriving a simulated ring signal from the high-voltage output, the high-voltage switch comprising a first stage responsive to a first transition of the ring timing signal for passing the positive high voltage output to the other connector; and a second stage responsive to a second transition of the ring timing signal for passing the negative high voltage output to the other connector; and means for applying the simulated ring signal to the other connector.

12. A portable, self-contained battery-powered adapter for connection between a fax sender and a fax receiver, comprising two telephone line connectors;

an oscillator producing a clock signal;

a divide-by-n counter driven by the clock signal to produce a simulated dialtone signal and a ring timing signal;

means for applying the simulated dialtone signal to one of the connectors;

a DC-to-DC converter driven by the same clock signal to produce a high-voltage output;

a high-voltage switch responsive to the ring timing signal for deriving a simulated ring signal from the high-voltage output;

means for applying the simulated ring signal to the other connector; and a tone detector responsive to an input signal from the one connector for producing a tone-detected signal;

the high-voltage switch connected to receive the tone-detected signal and deriving the simulated ring signal only after receiving the tone-detected signal.

13. A method of operatively interconnecting a fax sender directly to a fax receiver to accomplish printing or scanning using a low voltage battery for power, comprising automatically establishing a straight-through powerless connection between fax sender and fax receiver phone jacks, and briefly interrupting the straight-through connection under battery power to supply a simulated dialtone to one of the jacks and a simulated ring signal to the other jack, supplied by alternately switching positive and negative high voltage output from a low to high voltage DC-to-DC converter activated by a clock signal from which the simulated dialtone and ring signal are derived.

14. The method of claim 13 wherein the fax sender is a portable computer fax modem.

15. The method of claim 13 wherein the fax sender is a fax machine.

16. The method of claim 13 wherein the fax receiver is a portable computer fax modem.

17. The method of claim 13 wherein the fax receiver is a fax machine.

18. The method of claim 13 wherein the fax sender and receiver are both portable computer fax modems.

19. The method of claim 13 wherein the fax sender is a portable computer fax modem and the fax receiver is a fax machine.

20. The method of claim 13 wherein the fax receiver is a portable computer fax modem and the fax sender is a fax machine.

21. The method of claim 13, wherein the DC-to-DC converter comprises a transformer activated by the clock signal.

22. A method of operatively interconnecting a fax sender directly to a fax receiver to accomplish printing or scanning using a low voltage battery for power, comprising automatically establishing a straight-through powerless connection between fax sender and fax receiver phone jacks, briefly interrupting the straight-through connection under battery power to supply a simulated dialtone to one of the jacks and, after detecting a tone from the one jack, a simulated ring signal to the other jack, supplied by alternately switching positive and negative high voltage output from a low to high voltage DC-to-DC converter activated by a clock signal from which the simulated dialtone and ring signal are derived.

23. A method of operatively interconnecting a fax sender directly to a fax receiver to accomplish printing or scanning using a low voltage battery for power, comprising automatically establishing a straight-through powerless connection between fax sender and fax receiver phone jacks, briefly interrupting the straight-through connection under battery power to supply a simulated dialtone to one of the jacks and a simulated ring signal to the other jack, supplied by alternately switching positive and negative high voltage output from a low to high voltage DC-to-DC converter activated by a clock signal from which the simulated dialtone and ring signal are derived, and disconnecting the battery altogether upon receipt of an off-hook signal from the other jack to re-establish the straight-through connection.

* * * * *